United States Patent Office 3,154,580
Patented Oct. 27, 1964

3,154,580
DICYCLOHEXYLAMINE PROCESS
Ralph M. Robinson and Willard C. Braaten, Waukegan, Ill., assignors to Abbott Laboratories, North Chicago, Ill., a corporation of Illinois
No Drawing. Filed Oct. 9, 1961, Ser. No. 143,538
3 Claims. (Cl. 260—563)

The present application relates to the manufacture of dicyclohexylamine. More particularly, it relates to the preparation of dicyclohexylamine from cyclohexanone and cyclohexylamine.

Dicyclohexylamine has been commercially produced in the past by high-temperature/high-pressure catalytic reductions from aniline. With increasing demands for dicyclohexylamine, particularly as a rubber accelerator or vapor-phase corrosion inhibitor, alternate routes producing dicyclohexylamine in more economical yields are of great commercial interest.

It is therefore an object of the present invention to provide a new and improved process for the manufacture of dicyclohexylamine. Another object of the present invention is the commercial production of dicyclohexylamine from cyclohexanone and cyclohexylamine. A further object is the provision of a simple process for making dicyclohexylamine in good yields under mild conditions. A still further object of the present invention is the economical production of dicyclohexylamine of high purity. Other objects will be apparent from the following specification and the appended claims.

The objects of the present invention are accomplished by a low-pressure, reductive condensation of cyclohexylamine and cyclohexanone in the presence of a specific catalyst. The reductive condensation referred to above proceeds in such a manner that cyclohexylamine and cyclohexanone condense to N-cyclohexyl-cyclohexylimine which in turn is catalytically reduced to dicyclohexylamine.

In a general outline, the present process is carried out by mixing approximately molar quantities of cyclohexylamine and cyclohexanone with a hydrogenation catalyst, and reacting the formed Schiff-base with gaseous hydrogen at a temperature between room temperature and 100° C. and at a hydrogen pressure between atmospheric pressure and about 100 p.s.i.g. The specific catalyst for this reaction is selected from the group consisting of palladium, platinum or their oxides. Preferably, the catalyst is used in amounts of from about 0.05% to about 2.0% by weight of metal based on cyclohexanone, although higher catalyst ratios are permissible and may, for instance, be advantageous if the present process is carried out as a continuous operation, to which the reaction is easily adaptable. The hydrogen uptake can also be somewhat increased by raising the temperature or by increasing the hydrogen pressure within the range given above. However, no advantage is seen in raising the pressure above 100 p.s.i.g. The catalyst is preferably added in combination with a carrier such as carbon, silicon, dioxide, bentonite, asbestos, alumina, zirconium oxide, etc., carbon producing somewhat better results. The catalyst may also be used in the form of its oxide, whereby this oxide is first reduced in situ to its metallic form.

The process outlined above is far superior to any previously known preparation of dicyclohexylamine since the latter is obtained in yields above 95% and, very surprisingly, has outstanding purity. It is a particular advantage of the present invention that any by-products of this process occur only in extremely minor proportions and are of a boiling point very substantially below the boiling point of dicyclohexylamine. It is for this reason that the results of this new method are of such great value: the dicyclohexylamine can be obtained in a purity of above 99.5% by stripping the reaction mixture of its low-boiling content consisting mainly of water, cyclohexanol, and a very minor portion of unreacted cyclohexylamine. If desired, water can be removed by withdrawal of the bottom layer of the two-phase system obtained by this process, or it may be distilled off under relatively mild conditions together with the other low-boiling impurities. A further important advantage of the present invention is its operability under low pressure conditions which make the use of so-called low-pressure equipment such as Parr shakers or ordinary glass-lined vessels possible. Among the other advantages of the present process are the reuseability of the catalyst, the small amount of catalyst necessary, and the mild conditions under which this process can be carried out. Since this process consistently produces a yield of dicyclohexylamine in excess of about 95% and the catalyst can be reused, the new process is much more economical than older processes for manufacturing dicyclohexylamine.

To better illustrate the process of the present invention, the following examples are cited. It is to be understood that these examples are meant to be illustrations only and are not intended to limit the invention in any respect except as expressed in the claims.

Example 1

26.3 ml. of cyclohexyamine, 23.9 ml. of cyclohexanone, and 1.5 g. of catalyst, containing 5% palladium on carbon, are placed in a Parr shaker and subjected to hydrogen gas with a maximum pressure of 58 p.s.i.g. and a maximum temperature of 75° C. After 4 hours and 8 minutes, hydrogen uptake ceases. The reaction mixture is filtered and the organic top layer is analyzed by gas chromatography, indicating 97% of dicyclohexylamine, 2% of cyclohexylamine and cyclohexanol, and an unmeasurable trace of N-cyclohexylcyclohexylimine. By low-temperature stripping, cyclohexylamine and cyclohexanol are removed, leaving dicyclohexylamine with a purity of above 99.5%, as established by gas-chromatographic analysis. Vacuum distillation of this residue results in an almost quantitative yield of dicyclohexylamine as colorless liquid boiling at 256° C.

The catalyst used in the above run is reused for a second batch, producing substanitally the same result within the same hydrogenation period. By reusing the same catalyst six times, essentially no catalyst deactivation is observed.

Example 2

A mixture of 28.7 ml. of cyclohexylamine, 26.1 ml. of cyclohexanone, and 1.5 g. of 5% platinum on carbon, is subjected to hydrogen gas at a maximum pressure of 58 p.s.i.g. and at a maximum temperature of 75° C. Hydrogen uptake ceases after 3 hours and 47 minutes, whereupon the catalyst is filtered off. The resulting liquid forms a layer of about 8% (weight) of water which is removed from the bottom of the vessel. The remaining, organic phase contains 86.9% dicyclohexylamine, 6.0% cyclohexanol, 6.5% cyclohexylamine, and 0.7% of N-cyclohexyl-cyclohexylimine, as established by gas chromatography. Fractionation of this mixture produces an almost quantitative amount of colorless dicyclohexylamine of analytical purity.

The process to which the present invention is directed is very specific to platinum and palladium catalysts. Other catalysts such as nickel, ruthenium, rhodium, cobalt, etc. are inapplicable in this process since the reaction will be extremely slow or will not proceed at all, as, for instance, in the case of nickel in any of its well-known catalytic forms.

Others may practice the invention in any of the nu-

We claim:

1. The process of manufacturing pure dicyclohexylamine consisting of hydrogenating a mixture of about equimolecular amounts of cyclohexanone and cyclohexylamine in the presence of about 0.05–2.0% by weight of a catalyst selected from the group consisting of metallic palladium, metallic platinum, and the corresponding oxides, at a hydrogen pressure of between atmospheric pressure and about 100 p.s.i.g. and at a temperature from between room temperature and about 100° C., said amount of catalyst being based on the amount of cyclohexanone, and isolating the pure dicyclohexylamine from the reaction mixture by filtration and a subsequent low-temperature stripping step.

2. The process of claim 1 wherein said catalyst is supported by a carrier.

3. The process of claim 2 wherein said carrier is carbon.

References Cited in the file of this patent

UNITED STATES PATENTS

| | | |
|---|---|---|
| 2,270,215 | Fitch | Jan. 13, 1942 |
| 2,571,016 | Dankert et al. | Oct. 9, 1951 |
| 2,582,292 | Sondern et al. | Jan. 15, 1952 |
| 2,951,092 | Sowinski et al. | Aug. 30, 1960 |
| 3,019,262 | Ambelang | Jan. 30, 1962 |

OTHER REFERENCES

Skita et al.: Ber. Deut. Chem., vol. 61, pp. 1682–1692 (1928).